J. Letchworth,
Trace Hook.
No. 105,700.    Patented July 26. 1870.
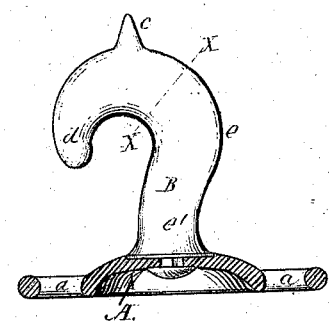
Fig. I.
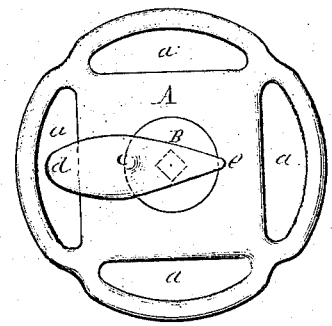
Fig. II.
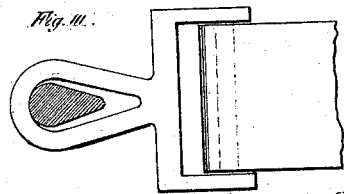
Fig. III.

United States Patent Office.

JOSIAH LETCHWORTH, OF BUFFALO, NEW YORK.

Letters Patent No. 105,700, dated July 26, 1870.

IMPROVED TRACE-SUPPORTING STUD.

The Schedule referred to in these Letters Patent and making part of the same.

I, JOSIAH LETCHWORTH, of the city of Buffalo, in the county of Erie and State of New York, have invented an Improved Trace-supporting Stud for Harness, of which the following is a specification.

My invention relates to a device attached to the back-strap of a harness, over the animal's hips, where the back-strap, crupper, and lazy-straps intersect, with which are engaged the cock-eyes of the traces, when the latter are not connected with the whiffletree, so as to support and keep the traces off of the ground, whether the harness is on or off of the animal.

The invention consists in constructing the upper end of such central projecting stud in the shape of a hook, arranged in a particular manner, with the rod, of which it is composed, made of such cross-sectional form as to conform, more or less, with the shape of the opening in the cock-eye, so that, when the latter is arranged over the stud, and has assumed its natural position, its accidental displacement therefrom is rendered almost impossible, as will hereinafter be more fully explained.

In the accompanying drawing—

Figure I is a sectional elevation of my improved article;

Figure II is a plan; and

Figure III a cross-section of the hook, in line $x\,x$, Fig. I.

Like letters of reference designate like parts in each of the figures.

A is the plate forming the body of the device, the outer edge of which is provided with loops, $a\,a\,a\,a$, or other suitable means, for connecting therewith the back-strap, crupper, and hip or lazy-straps, which intersect at this point, and are commonly attached to a simple ring.

B is the central upwardly-projecting stud or catch, the upper end of which is made in the form of a hook, constructed and arranged in the peculiar manner shown.

This hook is made of a form and size, in cross-section, to more or less nearly correspond with the opening in the cock-eye, as shown in Fig. III, and has a spur, $c$, projecting upward from the top or bottom.

The device is arranged with the point $d$ of the hook in front, or toward the animal's head, and the shoulder or projection $e$ at the rear. The shank $e'$, below this projection, should be made round, and of sufficient height to permit of the arrangement thereon, one above the other, of the two cock-eyes.

The stud may be cast separate from the plate A, and then be attached thereto by riveting, or in any other suitable manner.

The device being constructed and arranged as just described, the engagement therewith of the cock-eye, at the end of the trace, is effected by taking hold of the trace, with the cock-eye toward the head of the animal, and parsing it over the hook in an obvious manner, the inner and contracted end of the opening in the cock-eye corresponding, when in this position, with the tapering outer end and back portion of the hook. Letting go the hold of the trace, its gravity will cause the cock-eye to make a quarter revolution, so as to bring the shoulder $e$ in a position to engage with the side of the cock-eye, and thus retain it in place at the rear, while the point of the hook prevents displacement at the front, the disengagement of the cock-eye being possible only when in the position in which the connection was effected, which is the one it is the least likely to accidentally assume; and even should it obtain this position, it must be retained in the same unnatural relative arrangement until it has passed the crown of the hook. Otherwise, it will be arrested by the spur $c$, and its further displacement prevented.

What I claim as my invention, is—

The arrangement, with the casting A, provided with loops $a$, of the hook $d$, made of cross-sectional form to correspond with the opening in the cock-eye, the shoulder $e$ and spur $c$ projecting upward from the crown of the hook, as and for the purpose hereinbefore described.

JOSIAH LETCHWORTH.

Witnesses:
JAY HYATT,
CHARLES H. MILLER.